(12) United States Patent
Groult

(10) Patent No.: US 9,168,921 B2
(45) Date of Patent: Oct. 27, 2015

(54) METHOD FOR WARNING A DRIVER OF A MOTOR VEHICLE OF AN OBSTACLE PRESENT IN A SIDE AREA NEXT TO A SIDE FLANK OF THE VEHICLE AND MOTOR VEHICLE WITH A DRIVER ASSISTANCE SYSTEM

(75) Inventor: Xavier Groult, Survilliers (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 250 days.

(21) Appl. No.: 13/809,172

(22) PCT Filed: Jul. 17, 2010

(86) PCT No.: PCT/EP2010/004373
§ 371 (c)(1),
(2), (4) Date: Jan. 9, 2013

(87) PCT Pub. No.: WO2012/010180
PCT Pub. Date: Jan. 26, 2012

(65) Prior Publication Data
US 2013/0110372 A1 May 2, 2013

(51) Int. Cl.
G06F 7/70 (2006.01)
B60W 30/09 (2012.01)
B62D 15/02 (2006.01)
G08G 1/16 (2006.01)
B60W 30/095 (2012.01)

(52) U.S. Cl.
CPC .............. B60W 30/09 (2013.01); B60W 30/095 (2013.01); B62D 15/029 (2013.01); G08G 1/16 (2013.01)

(58) Field of Classification Search
CPC .............. G06F 7/70; G06G 7/76; G06G 7/00
USPC .................. 701/36, 41, 70, 300, 301
See application file for complete search history.

(56) References Cited

U.S. PATENT DOCUMENTS

2011/0068953 A1* 3/2011 Toledo et al. .............. 340/932.2
2012/0277957 A1* 11/2012 Inoue et al. ..................... 701/41

FOREIGN PATENT DOCUMENTS

| DE | 10 2006 043345 A1 | 4/2008 |
| DE | 10 2009 000401 A1 | 7/2010 |
| EP | 1 447 271 A2 | 8/2004 |
| EP | 1 947 476 A2 | 7/2008 |

(Continued)

OTHER PUBLICATIONS

International Search Report issued in PCT/EP2010/004373 mailed Jan. 14, 2011 (3 pages).

*Primary Examiner* — Kim T Nguyen
(74) *Attorney, Agent, or Firm* — Osha Liang LLP

(57) ABSTRACT

The present invention relates to a method for warning a driver of a motor vehicle (2) of an obstacle (1) present in a side area (19) next to a side flank (13) of the vehicle (2) with the help of a driver assistance system (3), wherein during a motion of the vehicle (2) the obstacle (1) is detected by an ultrasonic sensor (5, 7) stationarily arranged on a vehicle bumper (6, 8), before the obstacle (1) leaves a detection area (10) of the ultrasonic sensor (5, 7) and enters the side area (19) next to the side flank (13). After the obstacle (1) leaves the detection area (10) a current position of the obstacle (1) in the side area (19) relative to the vehicle (2) is estimated by the driver assistance system (3), wherein the driver is warned by the driver assistance system (3) in dependency on a result of the estimation.

15 Claims, 5 Drawing Sheets

(56) References Cited

FOREIGN PATENT DOCUMENTS

| GB | 2 409 921 A | 7/2005 |
| JP | 6-189610 A | 7/1994 |
| JP | 2004-351992 A | 12/2004 |
| WO | 2005/118339 A1 | 12/2005 |
| WO | 2009/063710 A1 | 5/2009 |

* cited by examiner

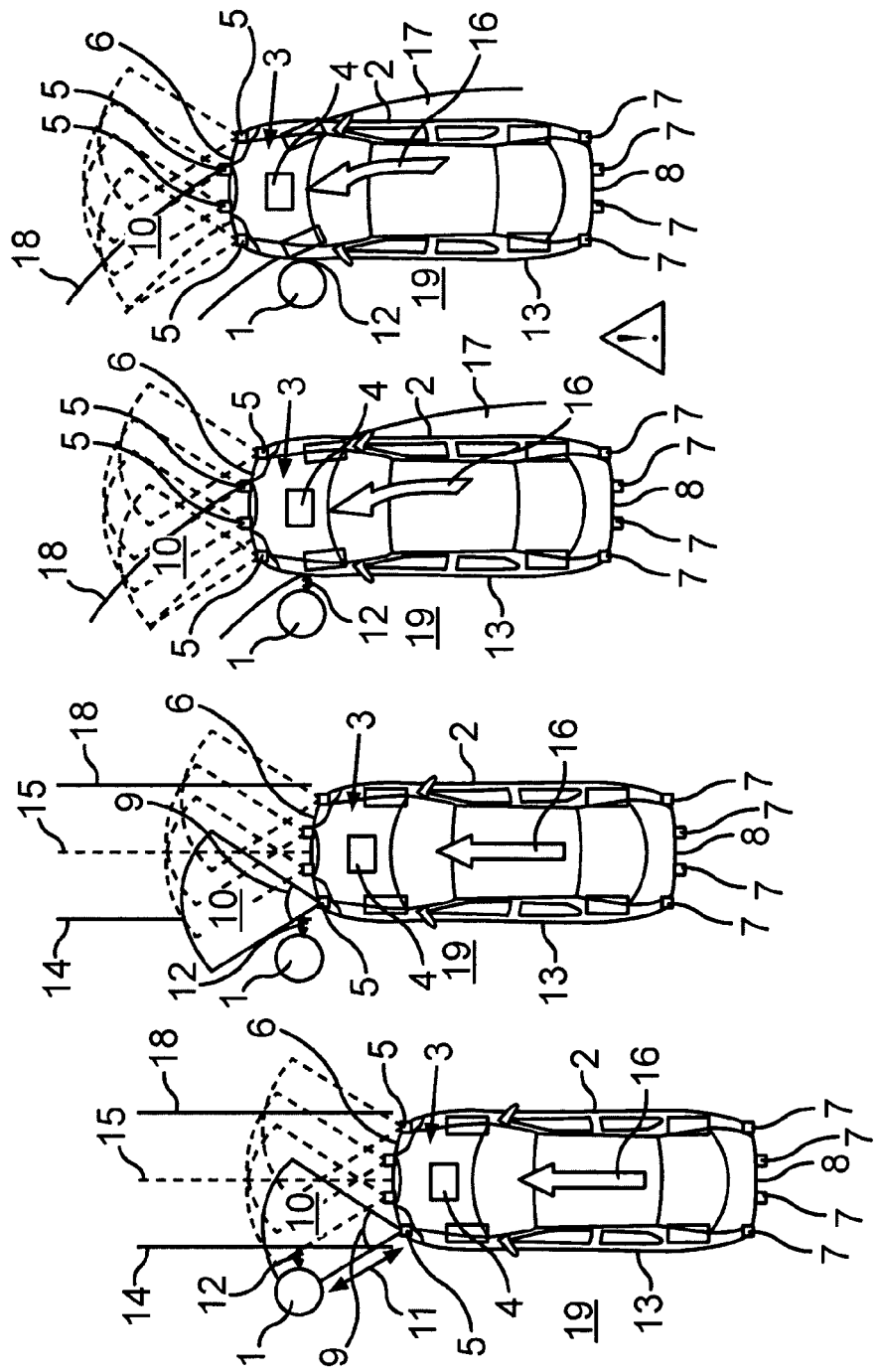

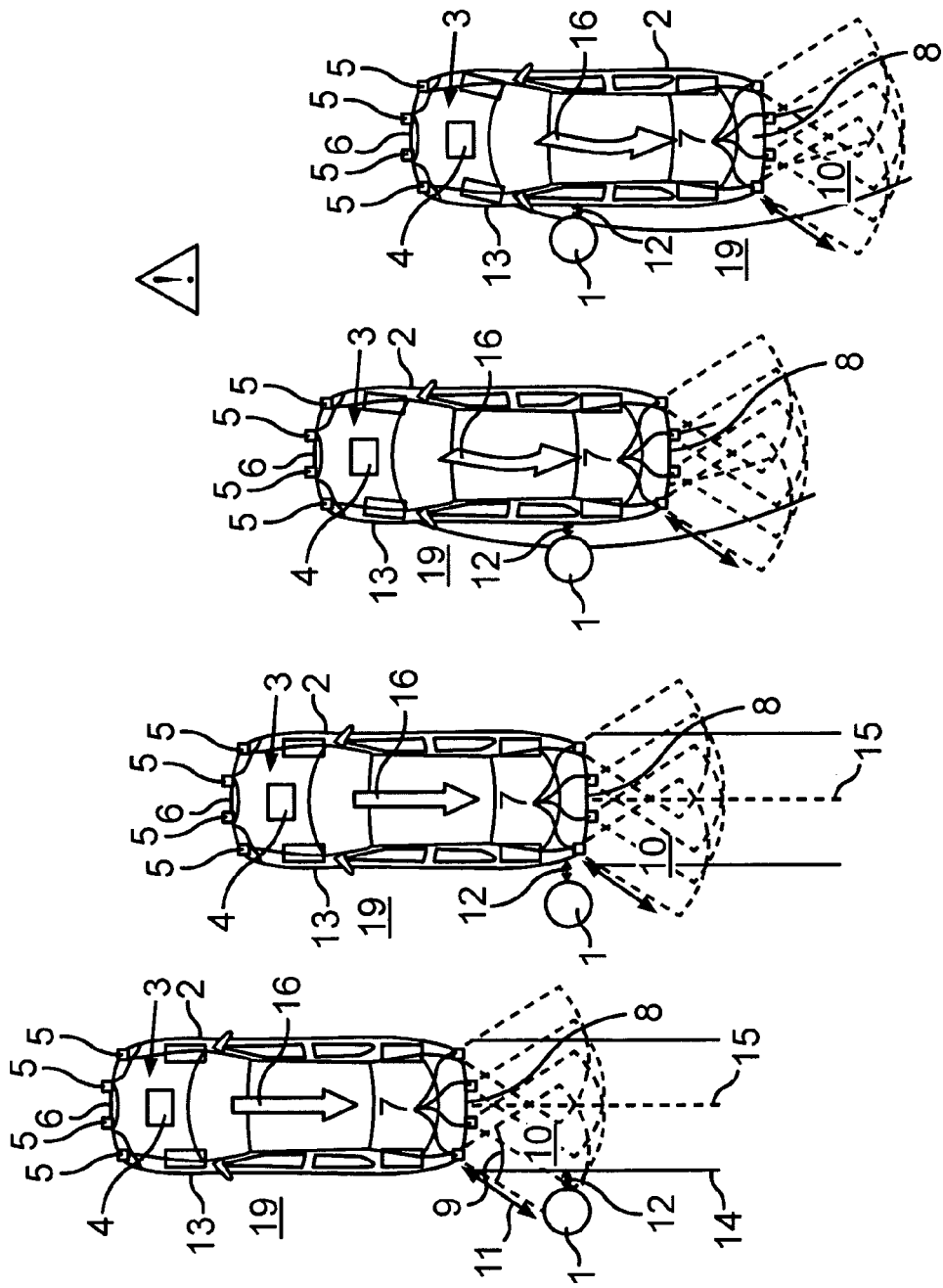

METHOD FOR WARNING A DRIVER OF A MOTOR VEHICLE OF AN OBSTACLE PRESENT IN A SIDE AREA NEXT TO A SIDE FLANK OF THE VEHICLE AND MOTOR VEHICLE WITH A DRIVER ASSISTANCE SYSTEM

BACKGROUND OF THE INVENTION

The present invention relates to a method for warning a driver of a motor vehicle of an obstacle present in a side area next to a side flank of the vehicle with the help of a driver assistance system. During a motion of the vehicle—forward or backward—the obstacle is detected by an ultrasonic sensor stationarily arranged on a vehicle bumper. The obstacle is detected before it leaves a detection area of the ultrasonic sensor and enters the side area next to the side flank of the vehicle. Furthermore, the present invention relates to a motor vehicle comprising a driver assistance system which is designed for performing such a method.

Driver assistance systems for warning the driver of an obstacle present in a side area next to the side flank of the vehicle are already known from the prior art. Also, it is prior art that obstacles can be detected by means of an ultrasonic sensor arranged on a vehicle bumper, a front bumper or rear bumper. The detection of obstacles using standard ultrasonic sensors—i.e. sensors located stationarily at the front or at the rear of the vehicle—is limited during sharp turns. Initially, an obstacle present in front of or behind the vehicle can be detected by the sensor. Even if the detected obstacle is initially not in the path of the car, it can become present in the path after the sensor loses touch with the obstacle, i.e. after the obstacle enters the side area next to the side flank of the vehicle. Then, the sensor can no longer monitor the obstacle, and a collision can occur between the vehicle and the obstacle.

The prior art faces this problem as follows: Document EP 1 447 271 A2 discloses a driver assistance system for monitoring an area close to a motor vehicle. This system comprises an ultrasonic sensor located on a side flank of the vehicle. Thus, a collision between the side flank and the obstacle can be prevented. The current position of the obstacle can also be tracked depending on the path of the vehicle determined by a path sensor. In order to prevent a collision with the obstacle, the system provides a warning signal tone or automatically brakes the vehicle. So, the obstacle is detected based on an ultrasonic sensor located on the side flank of the vehicle. However, not all vehicles are equipped with such a sensor.

Moreover, document JP 06189610 A describes a motor vehicle comprising an ultrasonic sensor located in the front of the vehicle. The adjustment of the sensor can be changed and regulated. Thus, the detection direction of the sensor can be changed together with the turning direction according to the steering angle.

Furthermore, document JP 2004 351 992 A discloses a driver assistance system for a motor vehicle. The system can compute a possible path of the vehicle depending on the current steering angle measured by a steering angle sensor. Thereafter, the system inclines one ultrasonic sensor in the opposite direction and one sensor in the same direction as the steering direction. Thus, obstacles can be detected which are present on the vehicle path.

So, in the prior art a sensor located at the side flank of the vehicle or a movable sensor is required for warning the driver of an obstacle present in the side area next to the side flank of the vehicle. Thus, it is a challenge to provide a method for preventing a collision between an obstacle and the side flank of the vehicle using only a single ultrasonic sensor located at the front or at the rear of the vehicle.

An object of the present invention is to provide a solution as to how a driver of a motor vehicle can be warned of an obstacle present in a side area next to a side flank of the vehicle using a standard ultrasonic sensor stationarily located at the front or at the rear of the vehicle.

This problem is solved—according to the invention—by means of a method with the features according to patent claim 1 as well as by means of a motor vehicle with the features of patent claim 15. Advantageous embodiments of the invention are subject matter of the dependent claims and of the description.

BRIEF SUMMARY OF THE INVENTION

According to the present invention, there is provided a method for preventing a collision between an obstacle and a side flank of a motor vehicle. A driver of the vehicle is warned of an obstacle present in a side area next to the side flank by means of a driver assistance system. During a motion of the vehicle the obstacle—initially present in front of or behind the vehicle—is detected by an ultrasonic sensor stationarily arranged on a vehicle bumper—at the front or at the rear of the vehicle. Then, during the motion of the vehicle the obstacle (which can be stationary) leaves a detection area of the ultrasonic sensor and enters the side area next to the side flank. After the obstacle leaves the detection area, a current position of the obstacle in the side area relative to the vehicle is estimated by the driver assistance system. The driver is warned by the driver assistance system in dependency on a result of the estimation.

Thus, according to the invention, the driver assistance system can track the obstacle present next to the side flank once the obstacle is detected by the ultrasonic sensor fixed to the bumper. The obstacle can be detected by means of only a single ultrasonic sensor located on the bumper, and no other sensors are required for detecting the obstacle. So, the obstacle is initially detected by the ultrasonic sensor facing—in particular—in the longitudinal direction of the vehicle. Then, once the obstacle is detected by the (single) ultrasonic sensor, a driver assistance system can estimate the current position of the obstacle relative to the vehicle, even after the sensor loses touch with the obstacle. The method according to the present invention has the advantage that only a single standard ultrasonic sensor stationarily located on a bumper is required for warning the driver of an obstacle present in the side area. In particular, no other sensors are required, especially no sensors at the side flank. The method according to the invention does without any sensors located on the side flank; the method can therefore be performed at low cost.

In one embodiment, the relative position of the obstacle is estimated by the driver assistance system on the basis of at least one measured parameter representing a motion behavior of the vehicle. Therefore, the relative position of the obstacle in the side area next to the side flank can be estimated with a great degree of precision. For instance, the relative position can be estimated on the basis of a steering angle and/or on the basis of a path covered by the vehicle and/or depending on a steering angle rate and/or in dependency on a distance covered by the vehicle since a point in time at which the obstacle left the detection area of the ultrasonic sensor. On the basis of said parameters, it is possible to exactly estimate the relative position of the obstacle.

The relative position can be estimated continuously during the motion of the vehicle once the obstacle is detected by the sensor.

Preferentially, as has been set out above, the step of estimating the relative position of the obstacle is performed without detecting the obstacle by a sensor arranged on the side flank. This means that the driver assistance system can estimate the current position of the obstacle without making use of any sensor located on the side flank of the vehicle. Thus, no additional sensor is required, and the method can be performed at low cost.

For the estimation of the relative position an assumption can be made relating to a lateral distance between the vehicle and the obstacle in the transverse direction of the vehicle. This allows using an ultrasonic sensor with a relatively wide detection range. On the one hand, such sensors are standard sensors that are widely used in the prior art so that it is not necessary to develop new ultrasonic sensors. On the other hand, the lateral distance or a lateral position of the obstacle relative to the vehicle cannot be measured by means of such a sensor. Thus, in this embodiment an assumption is made regarding the lateral distance between the vehicle and the obstacle in the transverse direction of the vehicle. The lateral direction is a direction between the obstacle and an imaginary line which runs through the side flank of the vehicle and in the longitudinal direction of the vehicle, i.e. parallel to the side flank. In particular, the assumption relating to the lateral distance is made at a point in time at which the obstacle is present in the detection area of the ultrasonic sensor. After the assumption is made regarding the lateral distance, the relative position of the obstacle can be easily estimated—on the basis of the steering angle, for instance.

For example, the lateral distance can be assumed to be a predetermined constant value. Therefore, the current position of the obstacle relative to the vehicle can be estimated with very little calculating effort. Alternatively, the lateral distance can be assumed to be a value depending on a direct distance between the vehicle and the obstacle being measured by the sensor before the obstacle leaves the detection area of the ultrasonic sensor. The following relation between the lateral distance and the measured direct distance can be applied: the greater the measured distance, the greater the lateral distance. This relationship can be a linear one. In this way, the relative position of the obstacle can estimated with greater precision.

In one embodiment, the step of estimating the relative position is performed under the assumption that the obstacle is a stationary one. This means that an assumption is made relating to the obstacle, namely that it is an immovable obstacle located stationarily in the surroundings of the vehicle. In this way, the calculating effort can be minimized while tracking the obstacle.

It has turned out to be advantageous when the relative position of the obstacle is estimated in dependency on a distance between the vehicle and the obstacle, the distance being measured by means of the ultrasonic sensor before the obstacle leaves the detection area of the ultrasonic sensor. Since the ultrasonic sensor is located on the bumper and faces, in particular, in the longitudinal direction of the vehicle, the measured direct distance is essentially a longitudinal distance, i.e. a distance in the longitudinal direction of the vehicle. The knowledge of this direct distance allows to track the obstacle after it leaves the detection area of the ultrasonic sensor. For instance, the driver assistance system can determine a distance covered by the vehicle and estimate the current position of the obstacle depending on the measured distance and the distance covered by the vehicle during the motion of the vehicle. In this way, the system can estimate the position of the vehicle relative to the side flank in the longitudinal direction of the vehicle. This allows to determine a point in time at which the rear wheel of the vehicle passes the obstacle during a forward motion or the front corner of the vehicle passes the obstacle during a backward motion—from this point in time, there is no risk of a collision between the obstacle and the vehicle.

As has been set out above, the relative position of the obstacle can be estimated in dependency on at least one measured parameter representing the motion behaviour of the vehicle. This means that the obstacle can be tracked based on measured values of at least one parameter describing the motion behaviour of the vehicle. For instance, the relative position of the obstacle can be estimated in dependency on at least one of the following parameters:

- in dependency on a steering angle of a steering wheel of the vehicle and/or
- in dependency on a velocity of the vehicle and/or
- in dependency on a path (curve) covered by the vehicle—the path can be determined by the driver assistance system on the basis of the measured values of the steering angle, and/or
- in dependency on a distance covered by the vehicle since a point in time at which the obstacle left the detection area of the sensor—this covered distance can be calculated on the basis of a velocity of the vehicle.

On the basis of said parameters, it is possible to determine the trajectory of the vehicle and so to easily estimate the current position of the obstacle relative to the side flank of the vehicle. Depending on said parameters, the obstacle can be tracked with greatest precision.

The driver is warned by the driver assistance system in dependency on a result of the estimation, i.e. in dependency on a result of the obstacle tracking. For instance, a warning criterion relating to the estimated relative position can be defined and stored in the driver assistance system. Then, the driver can be warned by the driver assistance system upon the predetermined warning criterion relating to the estimated relative position being fulfilled. The warning criterion can comprise the condition that an estimated direct distance between the vehicle and the obstacle falls below a predetermined distance value. In this way, a collision between the obstacle and the vehicle can be prevented. The warning criterion can additionally comprise a condition relating to the at least one measured parameter representing the motion behaviour of the vehicle and/or a condition relating to the direct distance between the vehicle and the obstacle measured by the ultrasonic sensor before the obstacle leaves the detection area of the sensor. For instance, the warning criterion can also comprise the condition that the obstacle is situated within an area between the rear wheel and the front corner of the vehicle—for the forward motion—or between the rear corner and the front corner of the vehicle in the longitudinal direction of the vehicle—for the backward motion. Namely, the collision between the vehicle and the obstacle can occur only if the obstacle is situated next to the side flank of the vehicle between the rear wheel and the front corner (forward motion) or between the rear corner and the front corner (backward motion). Thus, the driver is warned by the driver assistance system only if it is really necessary.

Said warning criterion can comprise a condition regarding the steering angle and/or a condition regarding the velocity of the vehicle and/or a condition regarding the distance covered by the vehicle since the point in time at which the obstacle left the detection area of the sensor. For instance, a limit value for the steering angle and/or for the velocity can be predefined, and the warning criterion can comprise the condition that the steering angle exceeds the associated limit value and/or the condition that the velocity exceeds the associated limit value. It is advantageous when different limit values are predetermined for the steering angle and/or the velocity depending on the distance covered by the vehicle. So, for different covered distance values and thus for different longitudinal positions of the obstacle relative to the vehicle different limit values for the steering angle and/or the velocity can be predefined. Such a solution is very reliable in operation, and a collision can be prevented with great reliability.

In one embodiment, a variable or a rate can be calculated from the steering angle and/or the vehicle velocity and/or the distance covered and the warning criterion can comprise a condition regarding to the calculated variable. For instance, the criterion can comprise the condition that the calculated variable exceeds a predefined limit value. The following dependency can be applied: the greater the steering angle, the greater the variable and/or the greater the vehicle velocity, the greater the variable and/or the greater the distance covered, the greater the variable. This dependency can be a linear one, for example. Then, the criterion can be checked very easily; it suffices to calculate the variable and to compare the variable with the limit value.

The step of warning the driver can comprise the step of decelerating the vehicle by means of the driver assistance system. For instance, the driver assistance system can cause a complete deceleration of the vehicle and thus bring the vehicle to a standstill. In this way, the collision between the obstacle and the vehicle can be prevented.

While braking the vehicle, the autonomous braking system can consider a steering angle rate of the steering wheel, i.e. a change speed of the steering angle. In this embodiment, for a high steering angle rate higher braking force can be applied on the vehicle wheels than for a small steering angle rate. So, the braking force applied on the vehicle wheels can be a function of the steering angle rate and can thus be set in dependence on the steering angle rate. A linear relationship can be applied for instance: Higher steering angle rate leads to higher braking force.

According to the present invention, there is also provided a motor vehicle comprising a driver assistance system for warning a driver of the vehicle of an obstacle present in a side area next to a side flank of the vehicle. The driver assistance system comprises a control unit for warning the driver. The system also comprises an ultrasonic sensor stationarily arranged on a vehicle bumper and having a detection area. The ultrasonic sensor is adapted to detecting an obstacle during a motion of the vehicle, before the obstacle leaves the detection area and enters the side area next to the side flank. The control unit can estimate a current position of the obstacle in the side area relative to the vehicle after the obstacle leaves the detection area. The control unit can warn the driver in dependency on a result of the estimation.

The embodiments presented as preferable with regard to the method according to the invention and their advantages apply to the motor vehicle according to the invention analogously.

Further features of the invention may be gathered from the claims, the figures and the description of the features. The features and feature combinations previously mentioned in the description as well as the features and feature combinations mentioned further along in the description of the figures and/or shown in the figures alone are usable not only in the respectively indicated combination, but also in other combinations and alone without departing from the scope of the invention.

BRIEF DESCRIPTION OF THE DRAWINGS

The invention is now set out in more detail on the basis of individual embodiments as well as by making reference to the enclosed drawings.

These show in:

FIGS. 1a to 1d each a schematic top view of a motor vehicle according to an embodiment of the present invention, wherein the vehicle is shown for different points in time so that a stationary obstacle is situated in different positions relative to the vehicle, and wherein a system of the vehicle causes a complete deceleration of the vehicle;

FIGS. 3a to 3d each a top view of the vehicle according to FIGS. 1 and 2, wherein the vehicle is shown in different points in time during a backwards motion, and wherein the system causes a complete deceleration of the vehicle;

DETAILED DESCRIPTION OF THE INVENTION

Figure 2D:
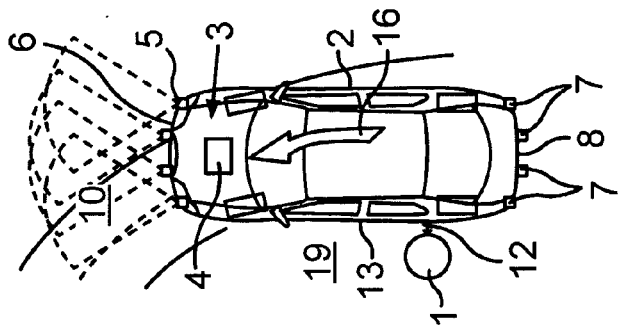
FIGS. 2a to 2d the scenario according to the FIGS. 1a to 1d, wherein no warning is effected by the system.
Figure 2C:
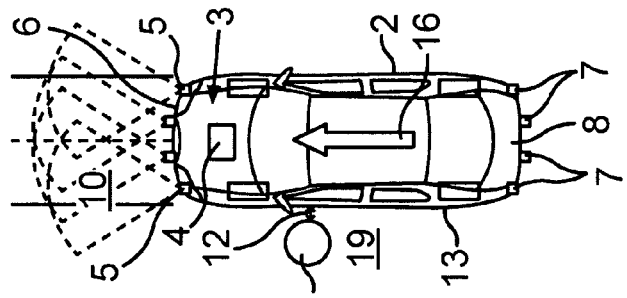
Figure 2B:
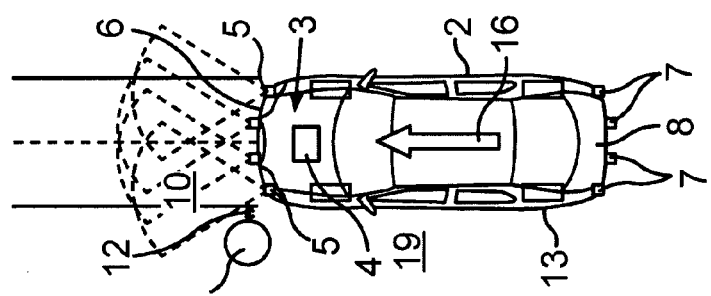
Figure 2A:
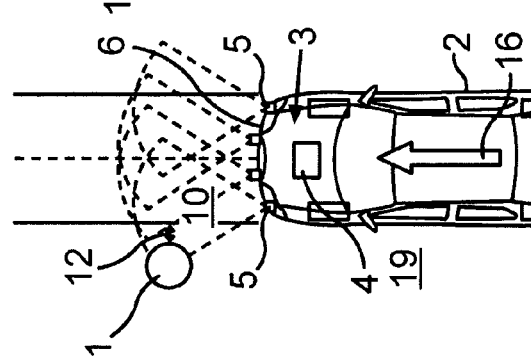

In the present case, what is of interest is to prevent a collision between an obstacle 1 and a motor vehicle 2. The vehicle 2 comprises a driver assistance system 3 for warning a driver of the vehicle 2 of the obstacle 1 present in the surroundings of the vehicle 2. The system 3 comprises a control unit 4 as well as several standard ultrasonic sensors 5 located on a front bumper 6 of the vehicle 2 as well as several standard ultrasonic sensors 7 arranged on a rear bumper 8 of the vehicle 2. In this embodiment, the system 3 comprises four sensors 5 stationarily and immovably located on the front bumper 6 as well as four sensors 7 arranged stationarily and immovably on the rear bumper 8. Each sensor 5, 7 has a relatively wide detection angle 9 and thus a relatively wide detection range; the angle 9 can be a 45° angle, for example. Each sensor 5, 7 has a detection area 10. The detection areas 10 of the detective sensors 5, 7 can overlap.

The control unit 4 is electrically connected to the sensors 5, 7. The control unit 4 receives measured values from the sensors 5, 7 and can process the received measured values.

Sometimes, the obstacle 1—as shown in FIG. 1a—can be detected only by one sensor 5, i.e. the sensor 5 located in the front-left corner of the vehicle 2. Then, no triangulation is possible to determine the exact position of the obstacle 1 relative to the vehicle 2. However, the sensor 5 located in the corner detects the obstacle 1, and the control unit 4 calculates a direct distance 11 based on measured values of the sensor 5.

The control unit 4 makes an assumption relating to a lateral distance 12 between the obstacle 1 and a side flank 13 of the vehicle 2, i.e. a distance between the obstacle 1 and a line 14 which runs through the side flank 13 and parallel to the longitudinal direction 15 of the vehicle 2. The lateral distance 12 can be assumed to be a constant value—for example, 10 cm or 20 cm or 30 cm—or to be a value depending on the distance 11. For instance, the lateral direction 12 can be a linear function of the direct distance 11.

The driver is driving the vehicle 2 forwards, namely in arrow direction 16. In FIG. 1a, the vehicle 2 is shown for a first point in time, whereas in FIG. 1b the vehicle 2 is shown at a later point in time, in FIG. 1c at a third point in time, and in FIG. 1d at a fourth point in time. As shown in FIG. 1b, the obstacle 1 leaves the detection area 10 of the sensor 5 located in the corner because of the motion of the vehicle 2. The obstacle 1 can be a stationary obstacle that is situated immovably in the surroundings of the vehicle 2. After the obstacle 1 leaves the detection area 10 and enters a side area 19 next to the side flank 13 (the side area 19 is an area next to the side flank 13 between the rear corner and the front corner of the vehicle 2), it is no longer possible to detect the obstacle 1 by means of the system 3. There are no further sensors located on the side flank 13 of the vehicle 2 or such sensors have another function in the vehicle 2. Since the control unit 4 determines the direct distance 11 and makes an assumption regarding the lateral distance 12 while the obstacle 1 is located in the detection area 10, the control unit 4 can continuously estimate the current position of the obstacle 1 relative to the vehicle 2. This current position can be estimated even after the obstacle 1 leaves the detection area 10. For this purpose, the control unit 4 receives information from several internal sensors located in the vehicle 2. The control unit 4 can receive information about a current steering angle of a steering wheel, information about a current velocity of the vehicle 2 as well as information about a steering angle rate, i.e. a speed of the steering angle change. Then, the control unit 4 causes a complete deceleration—complete braking—of the vehicle 2 if there is a risk of a collision between the obstacle 1 and the side flank 13. The control unit 4 makes an assumption that the obstacle 1 is a stationary obstacle.

So, the control unit 4 receives the information about the steering angle, about the steering angle rate, the vehicle velocity. Moreover, the control unit 4 determines the direct distance 11 and makes an assumption regarding the lateral distance 12. During the motion of the vehicle, the control unit 4 can estimate the current position of the obstacle 1 relative to the vehicle 2: the current relative position in the longitudinal direction 15 can be estimated in dependency on the measured direct distance 11 and the distance covered by the vehicle 2; and the current relative position in the lateral direction can be estimated depending on the assumed lateral distance 12 and the steering angle information.

The control unit 4 can calculate a path 17 (see FIG. 1c and FIG. 1d) covered by the vehicle 2 and/or an expected path 18 of the vehicle 2 depending on the steering angle. The control unit 4 can compute a distance covered by the vehicle 2 since a point in time at which the obstacle 1 left the detection area 10 of the sensor 5. In dependency on the covered distance, the control unit 4 can estimate the current position of the obstacle 1 in the longitudinal direction 15. If the obstacle 1 is located—in longitudinal direction 15—between the front corner and the rear wheel of the vehicle 2 (as in FIGS. 1b to 1d), the control unit 4 monitors the steering angle and thus the path 17 covered by the vehicle 2. In dependency on the current position of the obstacle 1 in longitudinal direction 15, different values of the steering angle may be allowed. Different limit values for the current steering angle as well as for the vehicle velocity may be predefined for different positions of the obstacle 1 in the longitudinal direction 15 relative to the vehicle 2. If the current steering angle and/or the velocity exceeds the associated limit value—this depends on the current position of the obstacle 1 in the longitudinal direction 15—the control unit 4 causes the complete deceleration of the vehicle 2 and thus brings the vehicle 2 to a standstill.

With reference to FIG. 1b, the obstacle 1 is located outside the detection area 10 of the sensor 5. The obstacle 1 has already reached the corner of the vehicle 2. However, the driver is driving straight ahead, as shown by path 18. Referring now to FIGS. 1c and 1d, the driver turns left and the lateral distance 12 between the obstacle 1 and the side flank 13 decreases. The control unit 4 estimates the current lateral distance 12 depending on the steering angle and the path 17 covered by the vehicle 2. The control unit 4 determines that a collision between the obstacle 1 and the vehicle 2 may occur and causes a complete deceleration of the vehicle 2. For the deceleration, a warning criterion may be predetermined. This criterion may include the condition that the current lateral distance 12 estimated by the control unit 4 falls below a predetermined distance value—5 cm or 10 cm or 15 cm or 20 cm, for instance. Also, the warning criterion may include the condition that the steering angle and/or the velocity is larger than a predefined limit value depending on the distance covered by the vehicle 2 since the point in time at which the obstacle 1 left the detection area 10. For example, a variable can be calculated from the steering angle and/or the vehicle velocity and/or the distance covered and the warning criterion can comprise the condition that the calculated variable exceeds a predefined limit value. The greater the steering angle, the greater the variable and/or the greater the vehicle velocity, the greater the variable and/or the greater the distance covered, the greater the variable. The variable can be a linear function of the steering angle and/or the vehicle velocity and/or the distance covered.

Referring now to FIGS. 2a to 2d, the same scenario is shown in which the control unit 4 monitors and tracks the obstacle 1 during the motion of the vehicle 2. In this scenario, the driver drives straight ahead until the obstacle 1 reaches the rear wheel of the vehicle 2—in the longitudinal direction 15. After the obstacle 1 reaches the rear wheel, no warning has to be given and no deceleration has to be effected by the control unit 4.

With reference to FIGS. 3a to 3d, a scenario is shown in which the vehicle 2 is driven backwards. In this case, the obstacle 1 is detected by a single sensor 7 located at the rear bumper 8 of the vehicle 2. Then, the obstacle leaves the detection area 10 of the sensor 7 during the backwards motion of the vehicle 2. As in the embodiment according to FIG. 1, the control unit 4 determines the direct distance 11 and makes an assumption with regard to the lateral direction 12. Then, the control unit 4 tracks the obstacle 1 during the motion of the vehicle 2. The control unit 4 estimates the current position of the obstacle 1 even after the obstacle 1 is located outside the detection area 10. Namely, the control unit 4 estimates the current position of the obstacle 1 relative to the vehicle 2 in the longitudinal direction 15 as well as the current lateral distance 12 between the obstacle 1 and the side flank 13. Also, in this case the control unit 4 monitors the current steering angle as well as the vehicle velocity. For different positions of the obstacle 1 relative to the vehicle 2 in longitudinal direction 15, different limit values for the steering angle and the velocity are predefined. The control unit 4 causes a total deceleration of the vehicle 2 if the estimated lateral distance 12 falls below the predetermined distance value. As shown in FIG. 3d, the control unit 4 causes a complete braking of the vehicle 2 after the lateral direction 12 falls under the limit value and the current steering angle exceeds the limit value.

Figure 4B:
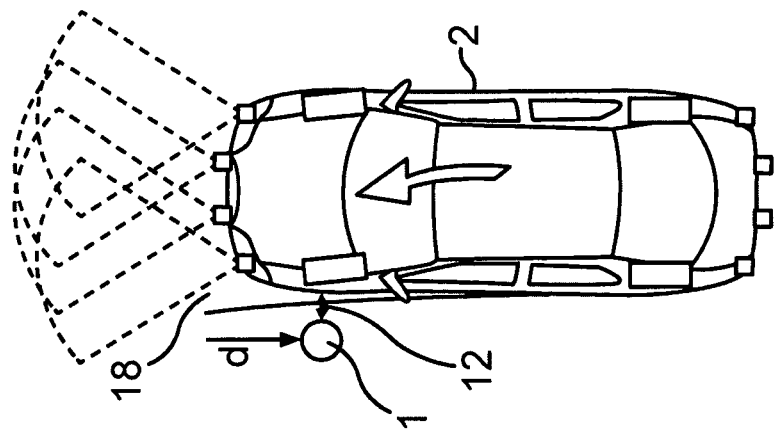
FIGS. 4a and 4b each a top view of the vehicle, wherein a method according to an embodiment of the present invention is explained in greater detail.
Figure 4A:
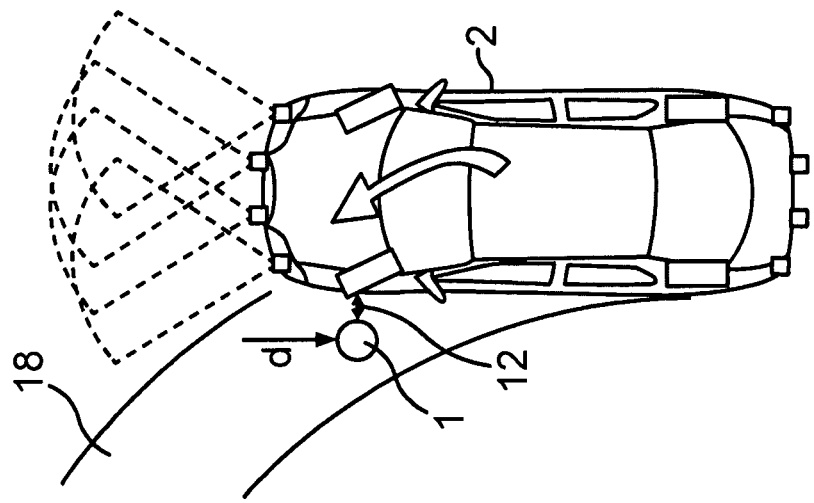

FIGS. 4a and 4b show the vehicle 2 as well as the obstacle 1 present in the side area 19 next to the side flank 13 of the vehicle 2. For a given distance d covered by the vehicle 2, two different steering angles and thus two different expected paths 18 of the vehicle 2 are shown in FIGS. 4a and 4b. For the given distance d covered by the vehicle 2 as well as for a given lateral distance 12, maximally only a predetermined steering angle value is allowed. If the steering angle exceeds the limit value, then a collision may occur between the obstacle 1 and the vehicle 2. The control unit 4 causes the total deceleration of the vehicle 2 if the current steering angle exceeds the limit value depending on the distance d covered by the vehicle 2 and if the estimated current lateral distance 12 falls below the predetermined distance value.

Figure 5B:
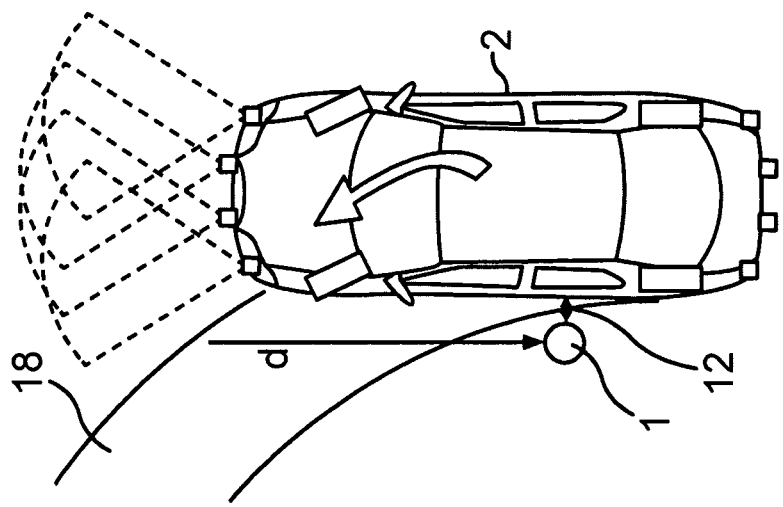
FIGS. 5a and 5b each a top view of the vehicle, wherein a method according to an embodiment of the present invention is explained in greater detail.
Figure 5A:
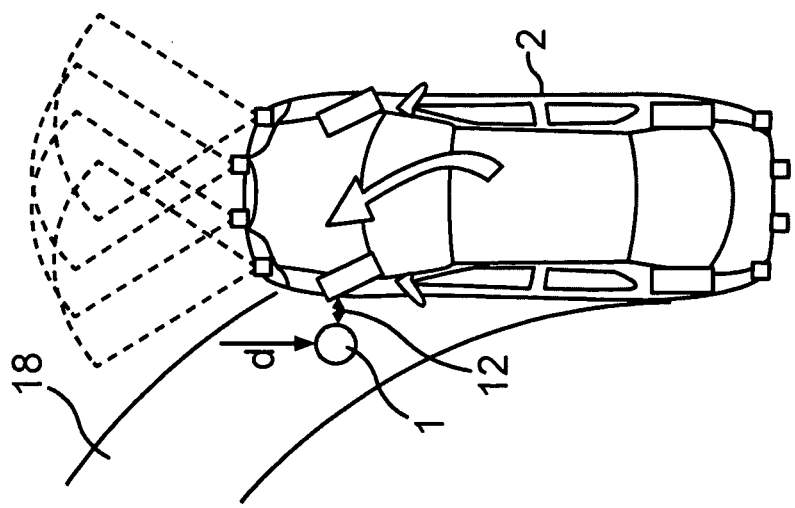

Referring now to FIGS. 5a and 5b, in analogy, the vehicle 2 is shown for two different values of the distance d covered by the vehicle 2. The current steering angle is the same in FIGS. 5a and 5b. As shown in FIGS. 5a and 5b, for a given steering angle, it depends on the covered distance d whether a collision between the obstacle 1 and the vehicle 2 may occur or not. On the one hand, the limit value for the steering angle is relatively small if the covered distance d is small. On the other hand, the limit value for the steering angle may be larger if the covered distance d is large.

In summary, the control unit 4 causes the complete deceleration of the vehicle 2 upon the predetermined warning criterion being fulfilled. This warning criterion firstly includes the condition that the estimated lateral distance 12 between the obstacle 1 and the side flank 13 is lower than the predetermined distance value. Also, the warning criterion may include the condition that the steering angle is larger than a predefined limit value depending on the distance d covered by the vehicle 2 since the point in time at which the obstacle 1 left the detection area 10.

The invention claimed is:

1. A method for warning a driver of a motor vehicle of an obstacle present in a side area next to a side flank of the vehicle using a driver assistance system, the method comprising:
    detecting the obstacle during a motion of the vehicle by an ultrasonic sensor stationarily arranged on a vehicle bumper at a front or at a rear of the vehicle, wherein the obstacle is detected before the obstacle leaves a detection area of the ultrasonic sensor and enters the side area next to the side flank; and
    after the obstacle leaves the detection area, estimating a current position of the obstacle in the side area relative to the vehicle by the driver assistance system, wherein the driver is warned by the driver assistance system in dependency on a result of the estimation.

2. The method according to claim 1, wherein the current position of the obstacle in the side area relative to the vehicle is estimated by the driver assistance system on the basis of at least one measured parameter representing a motion behavior of the vehicle.

3. The method according to claim 1, wherein the step of the estimating the current position of the obstacle in the side area relative to the vehicle is performed using only a single ultrasonic sensor fixed to the bumper.

4. The method according to claim 1, wherein for the estimation of the current position of the obstacle in the side area relative to the vehicle, an assumption is made relating to a lateral distance between the vehicle and the obstacle in the transverse direction of the vehicle.

5. The method according to claim 4, wherein the lateral distance is assumed to be a predetermined constant value or a value depending on a distance between the vehicle and the obstacle measured by the sensor arranged on the bumper before the obstacle leaves the detection area of the ultrasonic sensor.

6. The method according to claim 1, wherein estimating the current position of the obstacle in the side area relative to the vehicle is performed under an assumption that the obstacle is a stationary obstacle.

7. The method according to claim 1, wherein the current position of the obstacle in the side area relative to the vehicle is estimated in dependency on a direct distance between the vehicle and the obstacle, the distance measured by the sensor before the obstacle leaves the detection area of the ultrasonic sensor.

8. The method according to claim 1, wherein the current position of the obstacle in the side area relative to the vehicle is estimated in dependency on a steering angle as a measured parameter representing a motion behavior of the vehicle.

9. The method according to claim 1, wherein on the basis of a steering angle of the vehicle, a path covered by the vehicle is determined by the driver assistance system and the current position of the obstacle in the side area relative to the vehicle is estimated in dependence on the determined path as a parameter representing the motion behavior of the vehicle.

10. The method according to claim 1, wherein the current position of the obstacle in the side area relative to the vehicle is estimated in dependency on a distance covered by the vehicle since a point in time at which the obstacle left the detection area of the ultrasonic sensor, the covered distance being calculated on the basis of a velocity of the vehicle.

11. The method according to claim 1, wherein the driver is warned by the driver assistance system upon a predetermined warning criterion relating to the estimated current position of the obstacle in the side area relative to the vehicle being fulfilled.

12. The method according to claim 11, wherein the predetermined warning criterion comprises a condition that a direct distance between the vehicle and the obstacle estimated from the current position of the obstacle in the side area relative to the vehicle falls below a predetermined distance value.

13. The method according to claim 11, wherein the predetermined warning criterion comprises a condition relating to a current steering angle.

14. The method according to claim 1, wherein the step of warning the driver comprises a step of decelerating or completely braking the vehicle by the driver assistance system.

15. A motor vehicle comprising:
    a driver assistance system for warning a driver of the vehicle of an obstacle present in a side area next to a side flank of the vehicle, the driver assistance system comprising:
        a control unit for warning the driver and an ultrasonic sensor stationarily arranged on a vehicle bumper at a front or at a rear of the vehicle and having a detection area,
        the sensor being configured to detect the obstacle during a motion of the vehicle, before the obstacle leaves the detection area and enters the side area next to the side flank,
        wherein the control unit is adapted to estimate a current position of the obstacle in the side area relative to the vehicle after the obstacle leaves the detection area and to warning the driver in dependency on a result of the estimation.

\* \* \* \* \*